(12) United States Patent
Diochon et al.

(10) Patent No.: US 7,624,945 B2
(45) Date of Patent: Dec. 1, 2009

(54) AIRCRAFT ENGINE UNIT

(75) Inventors: Lionel Diochon, Toulouse (FR);
Guillaume Seguin, Le Havre (FR)

(73) Assignee: Airbus France, Toulouse (FR)

( * ) Notice: Subject to any disclaimer, the term of this patent is extended or adjusted under 35 U.S.C. 154(b) by 155 days.

(21) Appl. No.: 11/571,666

(22) PCT Filed: Aug. 1, 2005

(86) PCT No.: PCT/FR2005/050637

§ 371 (c)(1),
(2), (4) Date: Jan. 5, 2007

(87) PCT Pub. No.: WO2006/021721

PCT Pub. Date: Mar. 2, 2006

(65) Prior Publication Data

US 2007/0228213 A1    Oct. 4, 2007

(30) Foreign Application Priority Data

Aug. 4, 2004   (FR) .................................. 04 51784

(51) Int. Cl.
*B64D 27/00* (2006.01)
(52) U.S. Cl. .......................... 244/54; 248/554; 60/796; 60/797
(58) Field of Classification Search .................. 244/54, 244/53 R; 60/796, 797; 248/554, 557
See application file for complete search history.

(56) References Cited

U.S. PATENT DOCUMENTS

| | | | | |
|---|---|---|---|---|
| 4,634,081 A | * | 1/1987 | Chee | 244/54 |
| 5,078,342 A | * | 1/1992 | Langley et al. | 244/54 |
| 5,238,206 A | * | 8/1993 | Pachomoff | 244/54 |
| 5,320,307 A | * | 6/1994 | Spofford et al. | 244/54 |
| 5,725,181 A | * | 3/1998 | Hey | 244/54 |
| 5,921,500 A | * | 7/1999 | Ellis et al. | 244/54 |

(Continued)

FOREIGN PATENT DOCUMENTS

EP     1 053 936     11/2000

(Continued)

OTHER PUBLICATIONS

U.S. Appl. No. 11/914,327, filed Nov. 13, 2007, Diochon, et al.

(Continued)

*Primary Examiner*—Michael R Mansen
*Assistant Examiner*—Philip J Bonzell
(74) *Attorney, Agent, or Firm*—Oblon, Spivak, McClelland, Maier & Neustadt, L.L.P.

(57) ABSTRACT

The invention relates to an engine assembly for an aircraft comprising a turbojet, a engine mount pylon, and a plurality of engine mounts inserted between the engine mount pylon and the turbojet. According to the invention, the plurality of engine mounts comprises a engine mount (6*a*) designed so as to uniquely resist forces applied along a direction (Y) transverse to the turbojet, this engine mount (6*a*) comprising an intermediate fitting (46) assembled onto a first fitting (40) fixed to the pylon through two swivel axes (48) oriented parallel along a vertical direction (Z), and a pin (56) oriented along a longitudinal direction (X) and fixed to the intermediate fitting, the pin being installed on a second fitting (58) fixed to the turbojet, with clearance along the longitudinal direction (X).

10 Claims, 4 Drawing Sheets

U.S. PATENT DOCUMENTS

| | | | |
|---|---|---|---|
| 6,059,227 A * | 5/2000 | Le Blaye et al. | 244/54 |
| 6,189,830 B1 * | 2/2001 | Schnelz et al. | 244/54 |
| 6,341,746 B1 * | 1/2002 | Pascal et al. | 244/54 |
| 6,347,765 B1 * | 2/2002 | Jule et al. | 244/54 |
| 6,398,161 B1 * | 6/2002 | Jule et al. | 244/54 |

FOREIGN PATENT DOCUMENTS

| | | |
|---|---|---|
| EP | 1 053 938 | 11/2000 |

OTHER PUBLICATIONS

U.S. Appl. No. 11/632,077, filed Jan. 10, 2007, Diochon, et al.

U.S. Appl. No. 11/572,213, filed Jan. 17, 2007, Diochon, et al.

U.S. Appl. No. 11/572,003, filed Jan 12, 2007, Diochon, et al.

U.S. Appl. No. 11/571,666, filed Jan. 5, 2007, Diochon, et al.

* cited by examiner

AIRCRAFT ENGINE UNIT

TECHNICAL FIELD

This invention relates in general to an engine assembly for an aircraft of the type comprising a turbo-engine such as a turbojet, a engine mount pylon and a plurality of engine mounts inserted between this engine mount pylon and the turbojet.

STATE OF PRIOR ART

The engine mount pylon for such an engine assembly is designed to form the connection interface between a turbojet and a wing of the aircraft equipped with this assembly, in a known manner. The pylon is capable of transmitting the forces generated by the aircraft engine to the aircraft structure, and also is used for routing of fuel, electrical, hydraulic and air systems between the engine and the aircraft.

The pylon is provided with a rigid structure, for example a "box" type structure, in other words a structure formed by the assembly of spars and side panels connected to each other through transverse ribs, to transmit forces.

An assembly system is inserted between the engine and the rigid structure of the pylon, this system globally comprising a plurality of engine mounts, normally distributed in front engine mount(s) fixed to the engine fan case and aft engine mount(s) fixed to the centre case of this engine.

Furthermore, the assembly system comprises a device for resisting thrust forces generated by the engine. In prior art, this device may for example be in the form of two lateral rods connected firstly to an aft part of the engine fan case, and secondly to a engine mount mounted on the rigid structure of the pylon, for example an aft engine mount.

For information, it should be noted that the engine mount pylon is associated with a second assembly system inserted between this pylon and the wing of the aircraft, this second system normally being composed of two or three engine mounts.

Finally, the pylon is provided with a secondary structure for separation and support of systems while supporting aerodynamic fairings.

In conventional embodiments according to prior art, the design of engine mounts to satisfactorily resist all forces and moments transmitted by the turbojet to the rigid structure of the engine mount pylon is usually complex and expensive.

OBJECT OF THE INVENTION

Therefore, the purpose of the invention is to propose an aircraft assembly that at least partially overcomes the disadvantage mentioned above related to embodiments according to the prior art, and also to present an aircraft with at least such assembly.

To achieve this, the purpose of the invention is an engine assembly for an aircraft comprising a turbojet, a engine mount pylon and a plurality of engine mounts inserted between the engine mount pylon and the turbojet. According to the invention, the plurality of engine mounts comprises a engine mount designed so as to uniquely resist forces applied along a direction transverse to the turbojet, this engine mount comprising an intermediate fitting assembled onto a first fitting fixed to the engine mount pylon through two swivel axes arranged parallel along a vertical direction of the turbojet, and a pin oriented along a longitudinal direction of the turbojet fixed to the intermediate fitting, this pin being installed with clearance along the longitudinal direction on a second fitting fixed to the turbojet.

Advantageously, the engine assembly according to the invention comprises a engine mount, preferably a front engine mount, with a simple and inexpensive design and that resists forces applied along the transverse direction only.

The combination of the "monoball" type connection with the clearance along the longitudinal direction and two swivel connections oriented along the vertical direction and obtained using two corresponding swivel axes, then enables this engine mount with a simplified design to resist only forces applied along the transverse direction of the turbojet. As will be described in detail below, the fact of resisting forces applied along the transverse direction using front engine mounts can considerably simplify the design and the sizing of all engine mounts.

In this respect, the engine mount designed so as to resist only forces applied along the transverse direction is preferably fixed firstly to the front part of the rigid structure of the engine mount pylon, and secondly to a peripheral annular part of a fan case of the turbojet.

Furthermore, a plane defined by a longitudinal axis of the turbojet and the vertical direction of the turbojet forms a plane of symmetry for this engine mount designed so as to resist forces applied along the transverse direction only.

Preferably, the engine mount designed so as to simply resister forces applied along the transverse direction only forms a first front engine mount, and the plurality of engine mounts also comprises a second front engine mount also designed to resist forces applied along the transverse direction. In this case, the two front engine mounts are then arranged offset from each other in the vertical direction of the turbojet.

In other words, the engine assembly is made such that the moment applied about the longitudinal direction of the turbojet is resisted through front engine mounts with an offset in height and capable of resisting forces applied along the transverse direction.

However, since the front engine mounts could be fixed indifferently to a fan case or to a centre case of the turbojet, it is obviously possible to move them well away from each other in the vertical direction, for example by installing one of them on the fan case and the other on the centre case.

As mentioned above, this significant separation has the advantage that it considerably simplifies the design of engine mounts due to the fact that the forces that they have to resist, related to the moment about the longitudinal direction, are naturally lower than the typical forces encountered in conventional solutions according to prior art in which this same moment was resisted by two art engine mounts fixed to the centre case, which obviously could not be as far away from each other.

It should be noted that the two front engine mounts could both be arranged on the fan case at different heights, without going outside the scope of the invention.

It should be noted also that if the two front engine mounts are arranged offset from each other in the vertical direction of the turbojet so as to resister the moment applied about the longitudinal direction, then they may also be offset from each other along the longitudinal direction and/or along the transverse direction.

Preferably, the second front engine mount is fixed to a centre case of the turbojet and is designed to resist only forces applied along the transverse and vertical directions. In this preferred configuration in which the first front engine mount with a simplified design is fixed to the peripheral annular part of the fan case and in which the front engine mount is fixed to the centre case, it is quite easy to obtain a very large separation between the two front engine mounts along the vertical direction, compared with the value encountered previously and limited to the width of the rigid structure of the engine mount pylon.

Furthermore, the plurality of engine mounts may also comprise an aft engine mount designed so as to resist forces applied along the longitudinal, transverse and vertical directions.

Preferably, the plane defined by the longitudinal axis of the turbojet and the vertical direction of the turbojet passes through each of the plurality of engine mounts. Thus, it is clear that centering all engine mounts on the above mentioned plane, and therefore not having any engine mounts separated from each other in the transverse direction, can significantly reduce the width of the engine mount pylon along this transverse direction. Thus, the width reduction observed can advantageously reduce disturbances caused by the engine mount pylon to the fan flow in the annular fan duct.

Another purpose of the invention is an aircraft comprising at least one engine assembly like that described above.

Other advantages and characteristics of the invention will become clear after reading the following detailed non-limitative description.

BRIEF DESCRIPTION OF THE DRAWINGS

This description will be made with reference to the attached drawings among which.

DETAILED DESCRIPTION OF PREFERRED EMBODIMENTS

Figure 1:
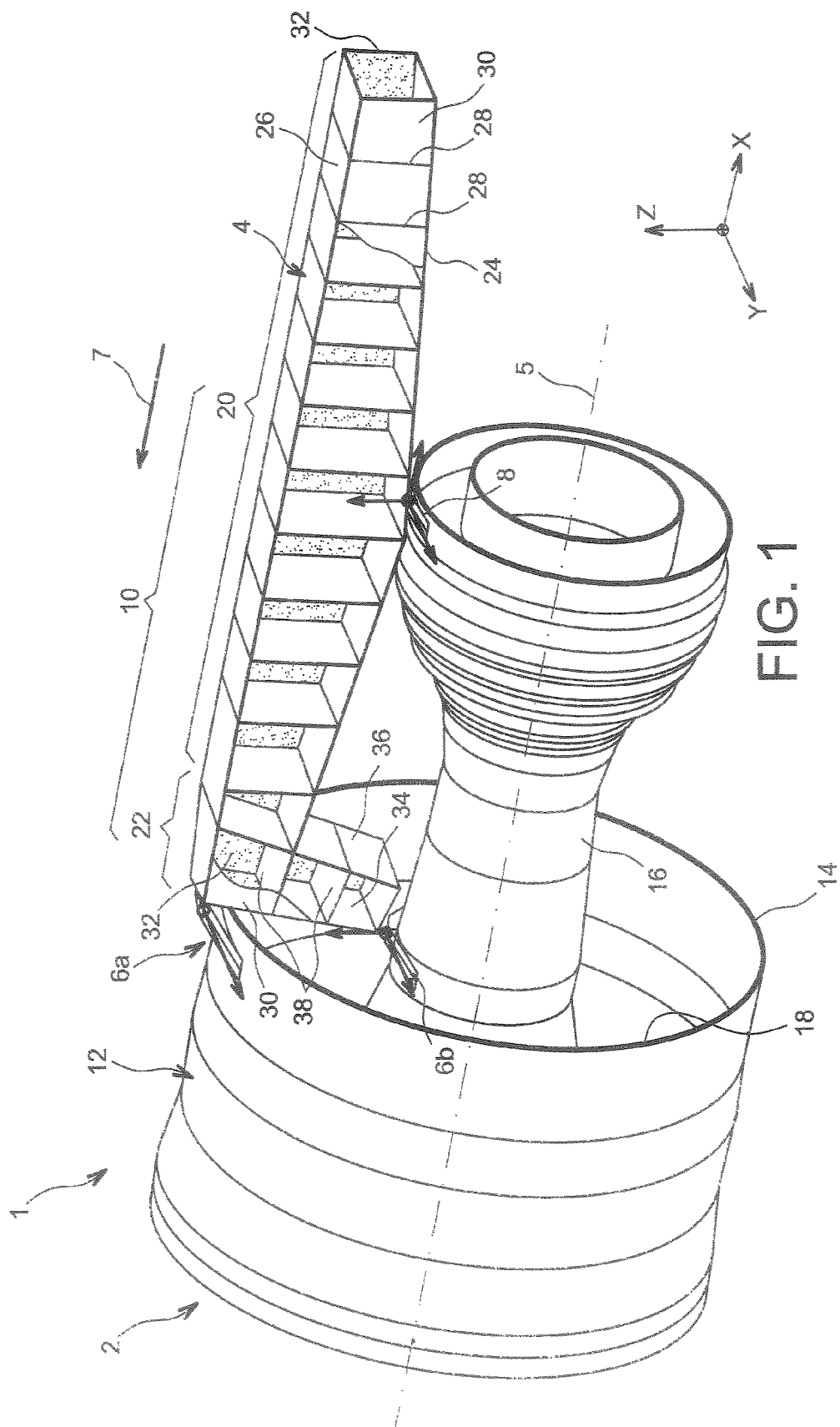
FIG. 1 shows a perspective view of an engine assembly for an aircraft according to a preferred embodiment of this invention.

FIG. 1 shows an engine assembly 1 for an aircraft according to a preferred embodiment of this invention, this assembly 1 being designed to be fixed under an aircraft wing (not shown).

Globally, the engine assembly 1 comprises a turbojet 2 that will be considered as being a turbojet 2 in the remainder of the description, a engine mount pylon 4, and a plurality of engine mounts 6a, 6b, 8 fastening the turbojet 2 under this pylon 4. For guidance, it should be noted that the assembly 1 will be surrounded by a nacelle (not shown) and the engine mount pylon 4 comprises another series of pylon mount (not shown) for suspending this assembly 1 under the wing of the aircraft.

By convention, in the remainder of the description, the longitudinal direction of the turbojet 2 that is parallel to a longitudinal axis 5 of this turbojet 2 will be denoted X, the transverse direction of this turbojet 2 will be denoted Y, and the vertical or height direction will be denoted Z, these three directions being orthogonal to each other.

Furthermore, the terms "front" and "aft" should be considered with respect to a forward movement direction of the aircraft that occurs as a result of the thrust applied by the turbojet 2, this direction being shown diagrammatically by the arrow 7.

FIG. 1 shows only one rigid structure 10 of the engine mount pylon 4. The other components not shown of this pylon 4, such as the secondary structure for separation and support of systems while supporting the aerodynamic fairings, are conventional elements identical or similar to those encountered in prior art and known to those skilled in the art. Consequently, no detailed description will be made of them.

Similarly, the assembly 1 is equipped with a device (not shown) for resisting thrust forces generated by the turbojet 2, which is identical to or similar to those encountered previously and which will therefore not be described in further detail.

The turbojet 2 has a large fan case 12 at the front end delimiting an annular fan duct 14, and towards the aft end has a smaller centre case 16 enclosing the core of this turbojet. Obviously, the casings 12 and 16 are fixed to each other, in a conventional manner known in prior art.

As can be seen in FIG. 1, the plurality of engine mounts 6a, 6b, 8 comprises two front engine mounts 6a, 6b each designed to resist forces applied along the transverse direction Y, and arranged offset from each other in the vertical direction Z.

More precisely, the first front engine mount 6a is fixed firstly to the front part of the rigid structure 10 of the pylon 4, and secondly to a peripheral annular part 18 of the fan case 12, preferably on the aft of this part 18 as shown diagrammatically in FIG. 1.

Furthermore, this first front engine mount 6a is mounted on the highest portion of this peripheral annular part 18, implying that a fictitious plane (not shown) defined by the longitudinal axis 5 and the Z direction passes through it. In this respect, it should be noted that the fictitious plane that has just been mentioned is a plane of symmetry for the first front engine mount 6a.

As will be described later, it should be noted that one of the special features of the invention is due to the fact that this first engine mount 6a is designed to resist only forces applied along the Y direction of the turbojet, and not along the X and Z directions.

Furthermore, the second front engine mount 6b is fixed firstly to the front end of the rigid structure 10 of the pylon 4, and secondly to the centre case 16, so that it is located below the first front engine mount 6a. Furthermore, this second front engine mount 6b is mounted on the highest annular portion of the centre case 16. In this respect, it should be noted that in the preferred embodiment shown, the two front engine mounts 6a, 6b are offset from each other only in the Z direction, and not in the X and Y directions. However, it would obviously be possible to arrange such an offset without going outside the scope of the invention.

Furthermore, this particular positioning of the second engine mount 6b implies that the fictitious plane mentioned above the defined by the longitudinal axis 5 and the Z direction also passes through it, this fictitious plane also forming a plane of symmetry for this second front engine mount 6b.

As shown diagrammatically by the arrows in FIG. 1, the second front engine mount 6b is designed so as to resist forces applied along the Y direction and along the Z direction of the turbojet only, but not forces along the X direction.

The plurality of engine mounts 6a, 6b, 8 also comprises a single aft engine mount 8, on which for example the thrust force resistance device of the assembly 1 can be fixed. This aft engine mount 8 is fixed firstly to the aft part of the centre case 16, preferably at an aft end of this casing 16, and secondly to the rigid structure 10 of the pylon 4, preferably at an approximately central part of it considered in the X direction.

In the same way as for the second front engine mount 6b, the aft engine mount 8 is made according to any form known to those skilled in the art, for example such as for the assembly of shackles and fittings. However, this aft engine mount itself is designed to resist forces applied along the three directions X, Y and Z.

Consequently, with the plurality of engine mounts that has just been described, forces along the X direction are resisted using the aft engine mount 8, forces along the Y direction are resisted using the three engine mounts 6a, 6b, 8, and forces along the Z direction are resisted using the first front engine mount 6a and the aft engine mount 8.

Furthermore, the moment applied about the X direction is resister jointly using two front engine mounts 6a, 6b, the moment applied about the Y direction is resisted jointly using the second front engine mount 6b and the aft engine mount 8, and the moment applied about the Z direction is resisted jointly using the three engine mounts 6a, 6b, 8.

Also with reference to FIG. 1, it can be seen that in the preferred embodiment shown, the rigid structure 10 of the engine mount pylon 4 comprises a centre case 20 extending approximately along the X direction and a front box 22 fixed to the central box 22 fixed to the central box 20 and extending approximately along the Z vertical direction.

More precisely, the central box 20 located at the back of the front box 22 is made by the assembly of the lower spar 24 and the upper spar 26 connected to each other through transverse ribs 28, preferably oriented in YZ planes. The spars 24 and 26 are oriented along XY planes, or along planes slightly inclined from XY planes.

It should be noted that the lower spar 24 and the upper spar 26 may each be made of a single part, or may consist of an assembly of several segments of spars rigidly fixed to each other.

Furthermore, the central box 20 is preferably closed laterally on each side by two sidewalls 30, 32 that each extend globally in an XY plane.

An upper part of the front box 22 is located in the front extension of the central box 20.

In other words, the front box 22 extending approximately along the Z direction is provided with a front spar 34 and an aft spar 36 that are both parallel to the Y direction and that are connected to each other through transverse ribs 38, preferably oriented in XY planes. In this respect, it should be noted that the highest transverse rib 38 is composed of the front end of the spar 26 of the central box 20, this front end also providing an upper closing of the front box 22. Similarly, the second highest transverse rib 38 is composed of the front end of the lower spar 24 of this central box 20.

Preferably, the front box 22 is closed laterally on each side by the two sidewalls 30, 32 also laterally closing the central box 20.

In this way, in the same way as for the rigid structure 10 considered as a whole, the two sidewalls 30, 32 each are in a global "L" shape, and the base of this L is approximately along the Z direction.

Concerning the rigid structure 10 of the pylon 4, it should be noted firstly that the first front engine mount 6a is preferably fixed to an upper part of the front spar 34 that is oriented in a YZ plane, and secondly the second front engine mount 6b is preferably fixed onto the lowest transverse rib 38 making the lower closure of the front box 22.

Figure 2:
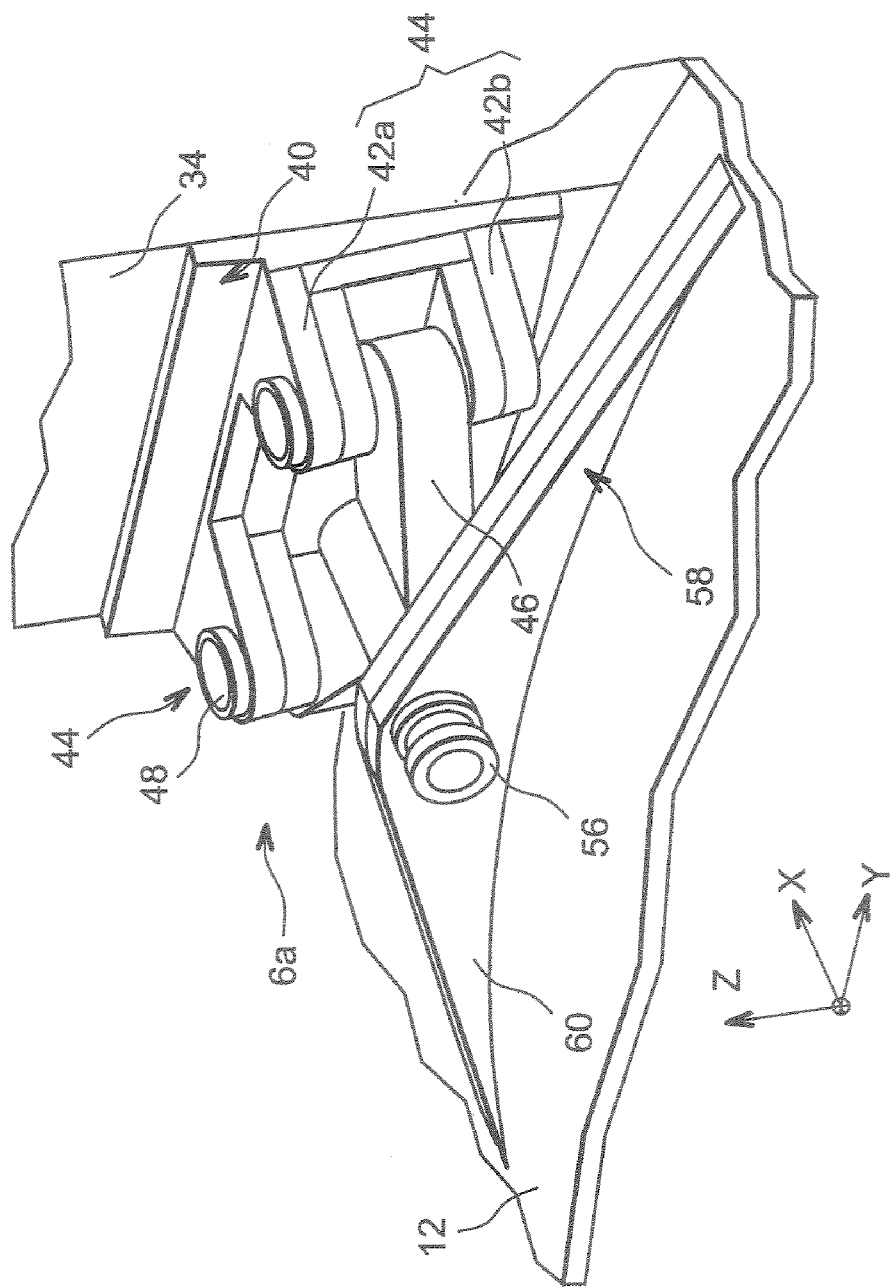
FIG. 2 shows a detailed perspective view of the first front engine mount of the engine assembly in FIG. 1, inserted between the fan case of the turbojet and the rigid structure of the engine mount pylon.
Figure 3:
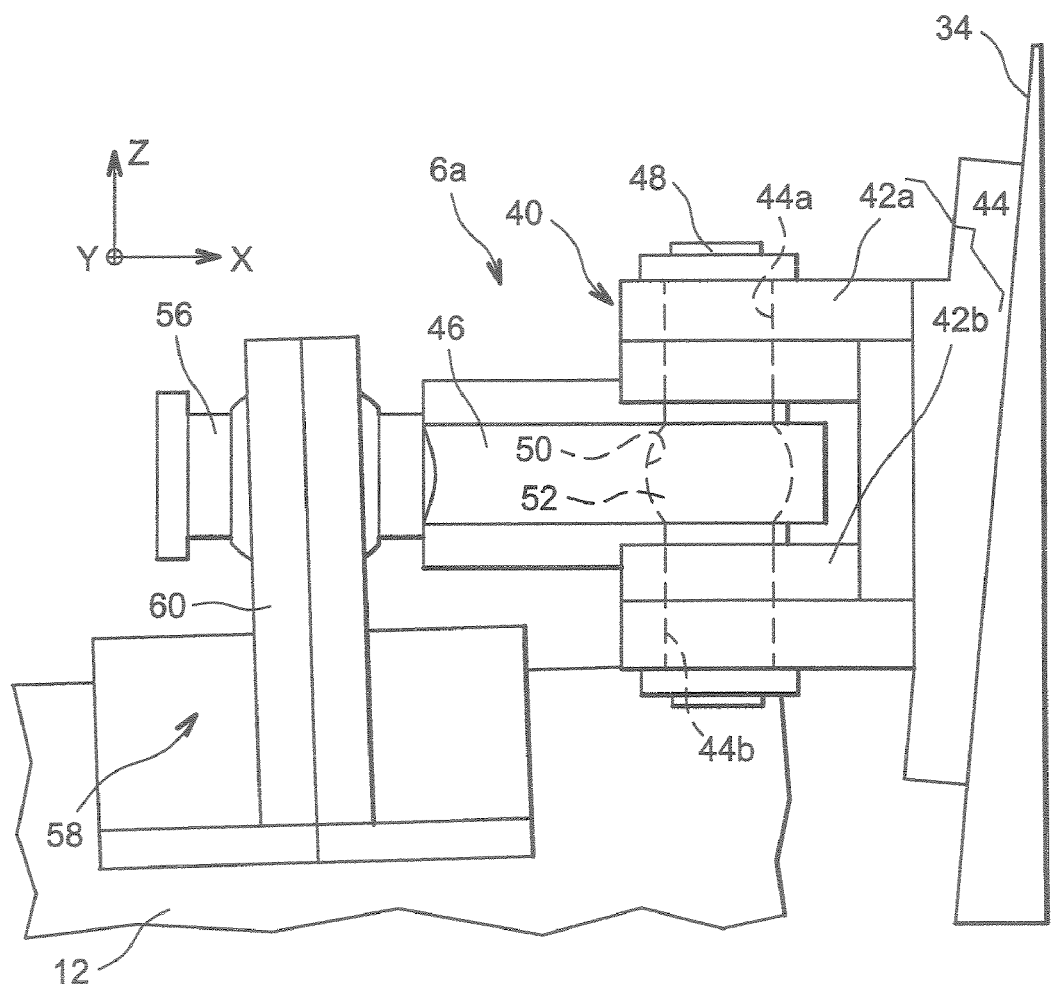
FIG. 3 shows a side view of the first front engine mount shown in FIG. 2.

The first front engine mount 6a, capable of resisting forces along the Y direction only, will now be described with reference to FIGS. 2 to 4.

This front engine mount 6a with a simplified design firstly has a first fitting 40, possibly made by the assembly of several metallic parts, which is fixed to the front spar 34 of the front box 22, and more generally to the rigid structure 10 of the pylon 4.

The first fitting 40 is symmetrical with respect to the vertical fictitious plane passing through the longitudinal axis 5 of the turbojet 2, and in particular comprises two pairs of heads 44, one located on each side of this plane.

Each pair of heads 44 comprises an upper head 42a, and lower head 42b at a spacing from the upper head in the Z direction, each of these two heads 42a, 42b being possibly doubled up and oreiented in an XY plane. Furthermore, the upper head 42a has a through orifice 44a oriented along the Z direction, in the same way as the lower head 42b has a through orifice 44b also oriented along the Z direction facing the orifice 44a.

Figure 4:
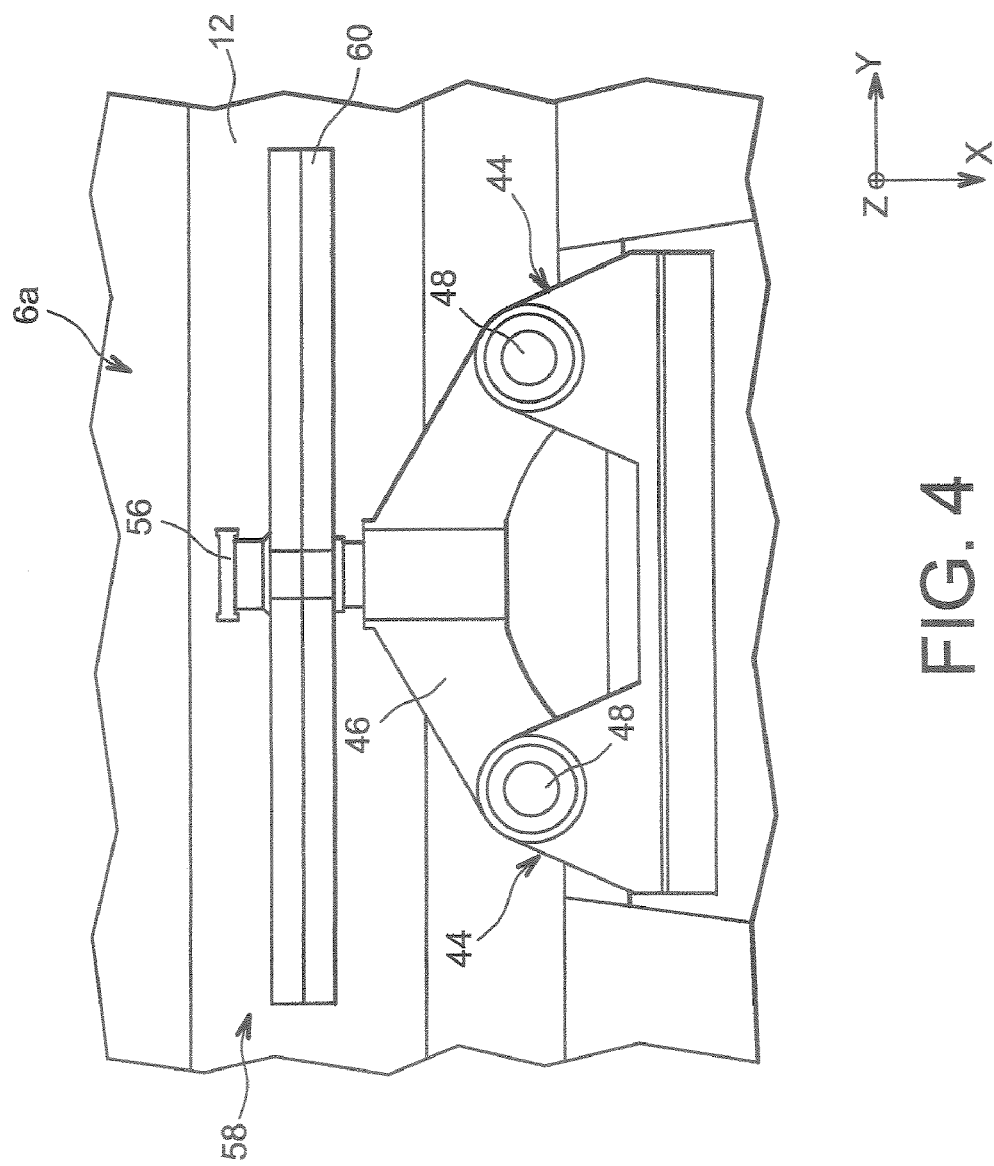
FIG. 4 shows a top view of the first front engine mount shown in FIGS. 2 and 3.

An intermediate fitting 46, preferably in a "V" shape extending in an XY plane as can be seen in FIG. 4, is connected to the first fitting 40 through two swivel pins 48 each oriented along the Z direction.

More precisely, each of the two ends of the V-shaped intermediate fitting 46 is installed on one of the two pairs of heads 44 using one of the two swivel pins 48, such that the swivel pins need to be arranged to be symmetric about the above mentioned fictitious plane. In this respect, it should be noted that this fictitious plane also forms a plane of symmetry for the intermediate fitting 46.

Thus, the swivel pin 48 at each of the two pairs of heads 44 passes in order through the orifice 44a of the upper head 42a, a through orifice 50 formed in the end concerned of the intermediate fitting 46, and finally the orifice 44b of the lower head 42b. Furthermore, the through orifice 50 mentioned above is adapted to cooperated with a swivel 52 of the swivel pin 48, as can be seen in FIG. 3.

In this way, it can be understood that the presence of these two swivel pins 48 can result in two swivel connections oriented along the Z direction and arranged symmetrically about the fictitious vertical plane mentioned above.

The front engine mount 6a comprises a pin 56 oriented along the X direction and fixed to the intermediate fitting 46 at the junction between the two branches of the V forming this intermediate fitting 46, the pin 56 being passed through diametrically by the fictitious vertical plane. Therefore the assembly formed by the pin 56 and the intermediate fitting 46 is in the form of a "Y", the lower branch of which is oriented forwards along the X direction.

The pin 56 is installed with clearance in the X direction on the second fitting 58 fixed to the turbojet 2, and more precisely on the upper portion of the peripheral annular part 18 of the fan case 12.

In other words, the mechanical connection made between the pin 56 and the second fitting 58 is of the "monoball" type, in other words it resists forces applied along the Y and Z directions only, while a clearance is allowed in the X direction. Consequently, the pin 56 may possibly slide in a very limited manner along the X direction with respect to an orifice (not shown) that it passes through and that is formed in a head 60 of the second and possibly double fitting 58 oriented in a YZ plane.

The combination of the monoball type connection with clearance along the X direction and the two ball joints oriented along the Z direction then leads to a first front engine mount 6a combined with the other engine mounts, to resist only the forces applied along the Y direction of the turbojet 2.

Obviously, those skilled in the art could make various modifications to the engine assembly 1 that has just been described only as a non-limitative example. In this respect, although the engine assembly 1 has been presented in a configuration such that it can be suspended under the aircraft wing, this assembly 1 could also be in a different configuration so that it could be mounted above this wing.

Furthermore, it is naturally possible to adopt any other configuration for the engine mounts 6b, 8. As an illustrative example, the second front engine mount 6b could be designed so as to resist forces applied along the three directions X, Y and Z, in which the aft engine mount 8 would then be designed so as to resist forces applied along the Y direction and along the Z direction of the turbojet only, but not forces applied along the X direction.

The invention claimed is:

1. An engine assembly for an aircraft comprising:
    a turbojet defining an X direction along a longitudinal axis of the turbojet, a Y direction along a transverse axis of the turbojet, and a Z direction along a vertical axis of the turbojet, the X, Y, and Z directions being orthogonal to each other;
    an engine mount pylon; and
    a plurality of engine mounts inserted between the engine mount pylon and the turbojet,
    wherein the plurality of engine mounts comprises a first engine mount, said first engine mount comprising:
        a first fitting fixed to the engine mount pylon,
        a second fitting fixed to the turbojet,
        an intermediate fitting between said first and second fittings, said intermediate fitting being V-shaped with two branches extending in an X-Y plane,
        wherein said intermediary fitting is assembled onto the first fitting through two swivel pins oriented parallel to each other and along the Z direction of the turbojet, each swivel pin passing through said first fitting and through one of said branches of said intermediary fitting, and each swivel pin defining a ball joint received in an opening of a corresponding branch of said intermediary fitting,
        a pin oriented along the X direction and fixed to the intermediate fitting, the pin being installed on the second fitting with clearance along the X direction so that said pin slides relative to said second fitting over said clearance along the X direction.

2. An assembly for an aircraft according to claim 1, wherein the first engine mount is fixed to a front part of a rigid structure of the engine mount pylon, and to a peripheral annular part of a fan case of the turbojet.

3. An assembly for an aircraft according to claim 1, wherein an X-Z plane including the longitudinal axis of the turbojet forms a plane of symmetry for the first engine mount.

4. An assembly for an aircraft according to claim 1, wherein the plurality of engine mounts further comprise an aft engine mount.

5. An aircraft comprising at least one engine assembly according to claim 1.

6. An assembly for an aircraft according to claim 1, wherein an assembly of said intermediary fitting and said pin forms a Y-shaped assembly extending in said X-Y plane, a lower branch of said Y-shaped assembly being connected to said second fitting.

7. An assembly for an aircraft according to claim 1, wherein the first engine mount forms a first front engine mount, and the plurality of engine mounts further comprise a second front engine mount, the first and second front engine mounts arranged offset from each other in the Z direction of the turbojet.

8. An assembly for an aircraft according to claim 7, wherein the second front engine mount is fixed to a center case of the turbojet.

9. An assembly for an aircraft according to claim 1, wherein the plurality of engine mounts further comprise a second engine mount and a third engine mount.

10. An assembly for an aircraft according to claim 9, wherein the first engine mount is fixed to a first front part of a rigid structure of the engine mount pylon, and to a peripheral annular part of a fan case of the turbojet,
    wherein the second engine mount is fixed to second front part of the rigid structure of the engine mount pylon, and to a center case of the turbojet, and
    wherein the third engine mount is fixed to a third part of the rigid structure of the engine mount pylon, and to an aft part of the center case of the turbojet.

* * * * *